2 Sheets—Sheet 1.

D. H. SHERMAN.

Apparatus for Depilating Animal Carcasses.

No. 9,714. Reissued May 17, 1881.

Witnesses

William Miller

Otto Lufland

Inventor

David H. Sherman by Van Santwood Hauff his attys

N. PETERS, Photo-Lithographer, Washington, D.C.

D. H. SHERMAN.

Apparatus for Depilating Animal Carcasses.

No. 9,714. Reissued May 17, 1881.

Witnesses
William Miller
Otto Hufeland

Inventor
David H. Sherman.
by Van Santvoord & Hauff
his attys

N. PETERS, Photo-Lithographer, Washington, D. C.

UNITED STATES PATENT OFFICE.

DAVID H. SHERMAN, OF DOVER PLAINS, NEW YORK.

APPARATUS FOR DEPILATING ANIMAL CARCASSES.

SPECIFICATION forming part of Reissued Letters Patent No. 9,714, dated May 17, 1881.

Original No. 144,150, dated October 28, 1873. Application for reissue filed December 16, 1880.

*To all whom it may concern:*

Be it known that I, DAVID H. SHERMAN, a citizen of the United States, residing at Dover Plains, in the county of Dutchess and State of New York, have invented a new and useful Improvement in Apparatus for Depilating Animal Carcasses, of which the following is a specification.

This invention is especially adapted to apparatus for scraping the hair from scalded hogs; and it consists in a trunk open at both ends for the reception and delivery of the carcass, depilating-scrapers on the interior of the trunk, spoon-shaped acting-points to the scrapers, a scalding table or floor at the upper end of the trunk, a receiving table or floor below the same, and an endless carrier having hooks for engaging the carcass, combined as hereinafter described, and pointed out in the claims.

Figure 1:
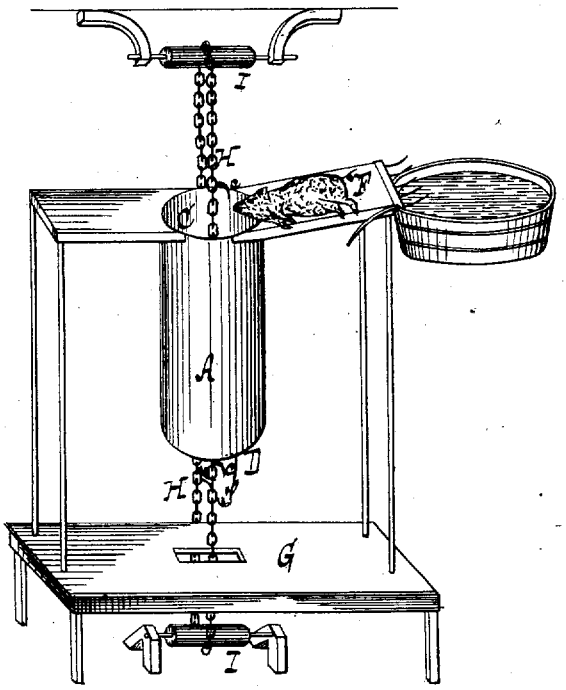
Figure 3:
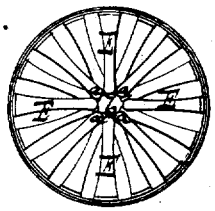
Figure 2:
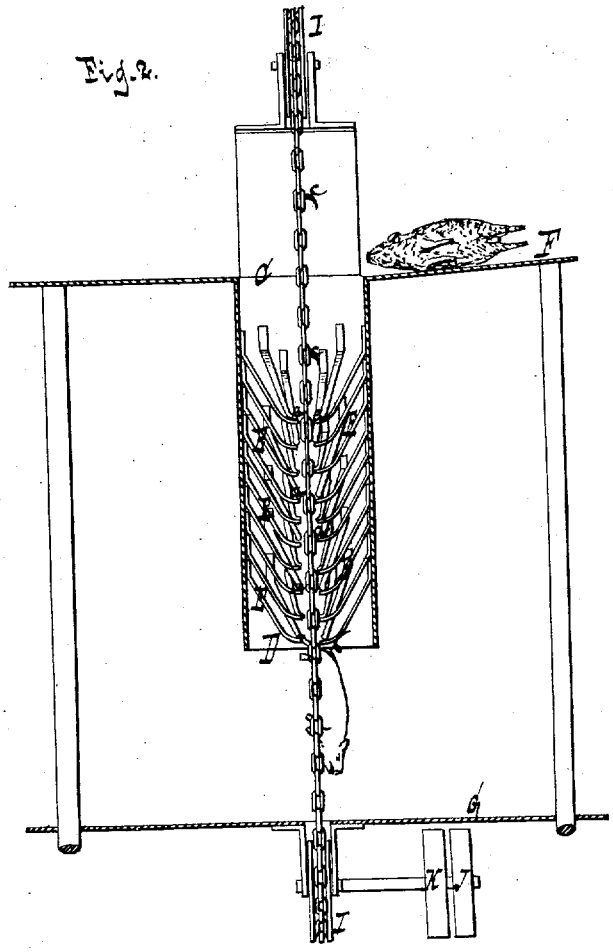

This invention is illustrated in the accompanying drawings, in which Figure 1 represents a perspective view. Fig. 2 is a vertical central section. Fig. 3 is a horizontal section of the trunk.

Similar letters indicate corresponding parts.

The apparatus consists of a cylinder or trunk, A, of any suitable construction and length, and said trunk is open at both ends, C D, and is provided on its interior with a series of scrapers, E, terminating in spoon-shaped acting-points *a*. The scrapers E, which are yielding, are arranged in series or rows one above the other, and extend from the walls of the trunk A toward the center thereof, leaving a central space, *b*, between them for the passage of the carcass, this space being, however, smaller in diameter than the carcass. The carcass is introduced at the upper end, C, of the trunk and discharged at its lower end, D, and in its transit it is subjected to the action of the scrapers E, whereby it is divested of hair and epidermis, so as to require little or no subsequent dressing, the ends or points *a* of the scrapers hugging the carcass and conforming to its shape. In order to facilitate the passage of the carcass through the trunk A, the scrapers E are inclined toward the delivery end thereof.

The cylinder or trunk is suspended from a scalding-table, F, in any suitable way that will permit the scalded carcass to be introduced into the trunk therefrom, while a second table or floor, G, is placed below the trunk a sufficient distance to receive the carcass thereupon as it leaves the trunk.

The carcass may be carried through the trunk A by its own weight and the force of its fall, in which case the trunk should be long enough above the scrapers E to give the proper momentum in the fall. In this example, however, the carcass is carried through the trunk by an endless chain, H, which is provided with hooks *c* and driven over pulleys I, so that it will pass through the center of the trunk and while moving will catch and drag the carcass along to the receiving-table, the strength of the scrapers E being suitable for either of these conditions.

The trunk A may be made in sections or with its sides open to afford facility for cleaning it out, and it may be suspended in water or otherwise.

The apparatus is arranged in a suitable frame, and the pulleys of the endless carrier H are so arranged that one part of the latter passes into and through the trunk, while the other passes outside of the same, and the shaft of the lower pulley is provided with a fast and loose pulley, J K, for a driving-band. The endless carrier H is designed as an auxiliary to the weight of the carcass in effecting its rapid descent; but generally the weight and momentum of the carcass will carry it through the trunk when let fall from an upper direction.

I am aware it is old to use a ring having scrapers on its interior for depilating animal carcasses, and such not being within the scope of my invention, I hereby disclaim the same.

What I claim as new, and desire to secure by Letters Patent, is—

1. A hog-cleaning apparatus consisting of a trunk open at both ends for the reception and delivery of the carcass, in combination with depilating-scrapers on the interior of such trunk, inclined toward the delivery end thereof, as shown and described.

2. A hog-cleaning apparatus consisting of a receiving and delivering trunk arranged in a substantially vertical position, in combination with depilating-scrapers on the interior of such trunk, as shown and described.

3. A hog-cleaning apparatus consisting of a receiving and delivering trunk arranged in a substantially vertical position, in combination with depilating-scrapers on the interior of such trunk, inclined toward its lower end, as shown and described.

4. The depilating-scrapers E, constructed with spoon-shaped acting-points, in combination with the receiving and delivering trunk, substantially as shown and described.

5. The combination of a receiving and delivering trunk arranged in a vertical position, and provided interiorly with the depilating devices, with a scalding table or floor at the upper end of such trunk and a receiving table or floor below the same, substantially as shown and described.

6. The combination, with the receiving and delivering trunk and its scrapers, of the endless carrier having hooks adapted to engage the carcass, substantially as shown and described.

In testimony that I claim the foregoing I hereunto set my hand and seal this 4th day of December, 1880.

D. H. SHERMAN. [L. S.]

Witnesses:
IRA D. WARREN,
A. S. CALDWELL.